United States Patent
Damnjanovic et al.

(10) Patent No.: US 10,616,769 B2
(45) Date of Patent: Apr. 7, 2020

(54) RADIO (NR) PROCEDURES FOR ACCESSING SHARED SPECTRUM

(71) Applicant: QUALCOMM Incorporated, San Diego, CA (US)

(72) Inventors: Aleksandar Damnjanovic, Del Mar, CA (US); Juan Montojo, San Diego, CA (US); Yisheng Xue, San Diego, CA (US); Michael Mingxi Fan, San Diego, CA (US); Xiaoxia Zhang, San Diego, CA (US); Taesang Yoo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 94 days.

(21) Appl. No.: 15/672,649

(22) Filed: Aug. 9, 2017

(65) Prior Publication Data

US 2018/0115907 A1 Apr. 26, 2018

Related U.S. Application Data

(60) Provisional application No. 62/413,281, filed on Oct. 26, 2016.

(51) Int. Cl.
| | |
|---|---|
| H04W 4/00 | (2018.01) |
| H04W 16/14 | (2009.01) |
| H04W 74/08 | (2009.01) |
| H04W 72/04 | (2009.01) |
| H04W 72/12 | (2009.01) |
| H04W 88/10 | (2009.01) |
| H04W 56/00 | (2009.01) |
| H04W 88/06 | (2009.01) |

(52) U.S. Cl.
CPC ....... *H04W 16/14* (2013.01); *H04W 72/0453* (2013.01); *H04W 72/1215* (2013.01); *H04W 74/0816* (2013.01); *H04W 56/001* (2013.01); *H04W 88/06* (2013.01); *H04W 88/10* (2013.01)

(58) Field of Classification Search
CPC ............... H04W 16/14; H04W 56/001; H04W 72/0453; H04W 72/1215; H04W 74/0816; H04W 88/06; H04W 88/10
USPC ......................................................... 370/329
See application file for complete search history.

(56) References Cited

U.S. PATENT DOCUMENTS

| | | |
|---|---|---|
| 9,253,778 B2 | 2/2016 | Ye et al. |
| 9,544,898 B2 | 1/2017 | Hu et al. |

(Continued)

OTHER PUBLICATIONS

International Search Report and Written Opinion—PCT/US2017/056319—ISA/EPO—dated Jan. 26, 2018.

*Primary Examiner* — Charles T Shedrick
(74) *Attorney, Agent, or Firm* — Patterson & Sheridan, L.L.P.

(57) ABSTRACT

Techniques for spectrum sharing among operators are provided. A base station (BS) licensed to a first operator monitors, while operating on a first carrier frequency assigned to the first operator, a reservation period on a second carrier frequency assigned to a second operator that shares spectrum with the first operator. The BS determines, based on the monitoring, availability of the second carrier frequency for use by the BS during at least one subsequent data period. The BS determines whether to attempt to reserve access on the second carrier frequency for use during the at least one subsequent data period based on the determined availability.

30 Claims, 7 Drawing Sheets

(56) References Cited

U.S. PATENT DOCUMENTS

| | | | |
|---|---|---|---|
| 2009/0219844 A1* | 9/2009 | Soliman | H04W 88/04 370/311 |
| 2015/0110065 A1* | 4/2015 | Gaal | H04W 16/14 370/330 |
| 2015/0289141 A1* | 10/2015 | Ghasemzadeh | H04W 16/14 370/330 |
| 2015/0358827 A1* | 12/2015 | Bendlin | H04W 72/0413 455/454 |
| 2016/0330743 A1* | 11/2016 | Das | H04W 76/10 |
| 2017/0048722 A1 | 2/2017 | Van et al. | |

* cited by examiner

RADIO (NR) PROCEDURES FOR ACCESSING SHARED SPECTRUM

INTRODUCTION

This application claims priority to U.S. Provisional Application Ser. No. 62/413,281 entitled "NEW RADIO (NR) PROCEDURES FOR ACCESSING SHARED SPECTRUM", filed on Oct. 26, 2016, which is expressly incorporated by reference in its entirety.

FIELD

Aspects of the present disclosure relate to wireless communications systems and, more particularly, to procedures for accessing a shared spectrum.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

These multiple access technologies have been adopted in various telecommunication standards to provide a common protocol that enables different wireless devices to communicate on a municipal, national, regional, and even global level. An example of an emerging telecommunication standard is new radio (NR, e.g., 5G radio access (RA)). NR is a set of enhancements to the LTE mobile standard promulgated by Third Generation Partnership Project (3GPP). It is designed to better support mobile broadband Internet access by improving spectral efficiency, lower costs, improve services, make use of new spectrum, and better integrate with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

As the demand for mobile broadband access continues to increase, using shared radio frequency spectrum (SRFS), which may include unlicensed radio frequency spectrum (URFS), has been considered to help solve the spectrum congestion problem for future wireless needs, not only to meet the growing demand for mobile broadband access, but also to advance and enhance the user experience with mobile communications. However, the SRFS may carry other transmissions, and therefore techniques such as listen before talk (LBT) and clear channel assessment (CCA) may be used in an effort to prevent excessive interference. In certain scenarios, wireless devices operating in a shared spectrum may be asynchronous. It may be desirable to mitigate interference caused by wireless devices operating in the scared spectrum.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

In an aspect, a method for wireless communication is provided. The method may be performed, for example, by a base station (BS) of a first operator. The method generally includes monitoring, while operating on a first carrier frequency assigned to the first operator, a reservation period on a second carrier frequency assigned to a second operator that shares spectrum with the first operator, determining, based on the monitoring, availability of the second carrier frequency for use by the BS during at least one subsequent data period, and determining whether to attempt to reserve access on the second carrier frequency for use during the at least one subsequent data period based on the determined availability.

Certain aspects of the present disclosure provide an apparatus for wireless communication by a BS of a first operator. The apparatus generally includes means for monitoring, while operating on a first carrier frequency assigned to the first operator, a reservation period on a second carrier frequency assigned to a second operator that shares spectrum with the first operator, means for determining, based on the monitoring, availability of the second carrier frequency for use by the BS during at least one subsequent data period, and means for determining whether to attempt to reserve access on the second carrier frequency for use during the at least one subsequent data period based on the determined availability.

Certain aspects of the present disclosure provide an apparatus for wireless communication by a BS of a first operator. The apparatus generally includes at least one processor and a memory coupled to the at least one processor. The at least one processor is generally configured to monitor, while operating on a first carrier frequency assigned to the first operator, a reservation period on a second carrier frequency assigned to a second operator that shares spectrum with the first operator, determine, based on the monitoring, availability of the second carrier frequency for use by the BS during at least one subsequent data period, and determine whether to attempt to reserve access on the second carrier frequency for use during the at least one subsequent data period based on the determined availability.

Certain aspects of the present disclosure provide a computer-readable medium for wireless communication by a BS, the computer-readable medium storing instructions which when executed by a processor perform a method. The method generally includes monitoring, while operating on a first carrier frequency assigned to the first operator, a reservation period on a second carrier frequency assigned to a second operator that shares spectrum with the first operator, determining, based on the monitoring, availability of the second carrier frequency for use by the BS during at least one subsequent data period, and determining whether to attempt to reserve access on the second carrier frequency for use during the at least one subsequent data period based on the determined availability.

Aspects of the present disclosure provide apparatus, methods, processing systems, and computer readable mediums for spectrum sharing among operators.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
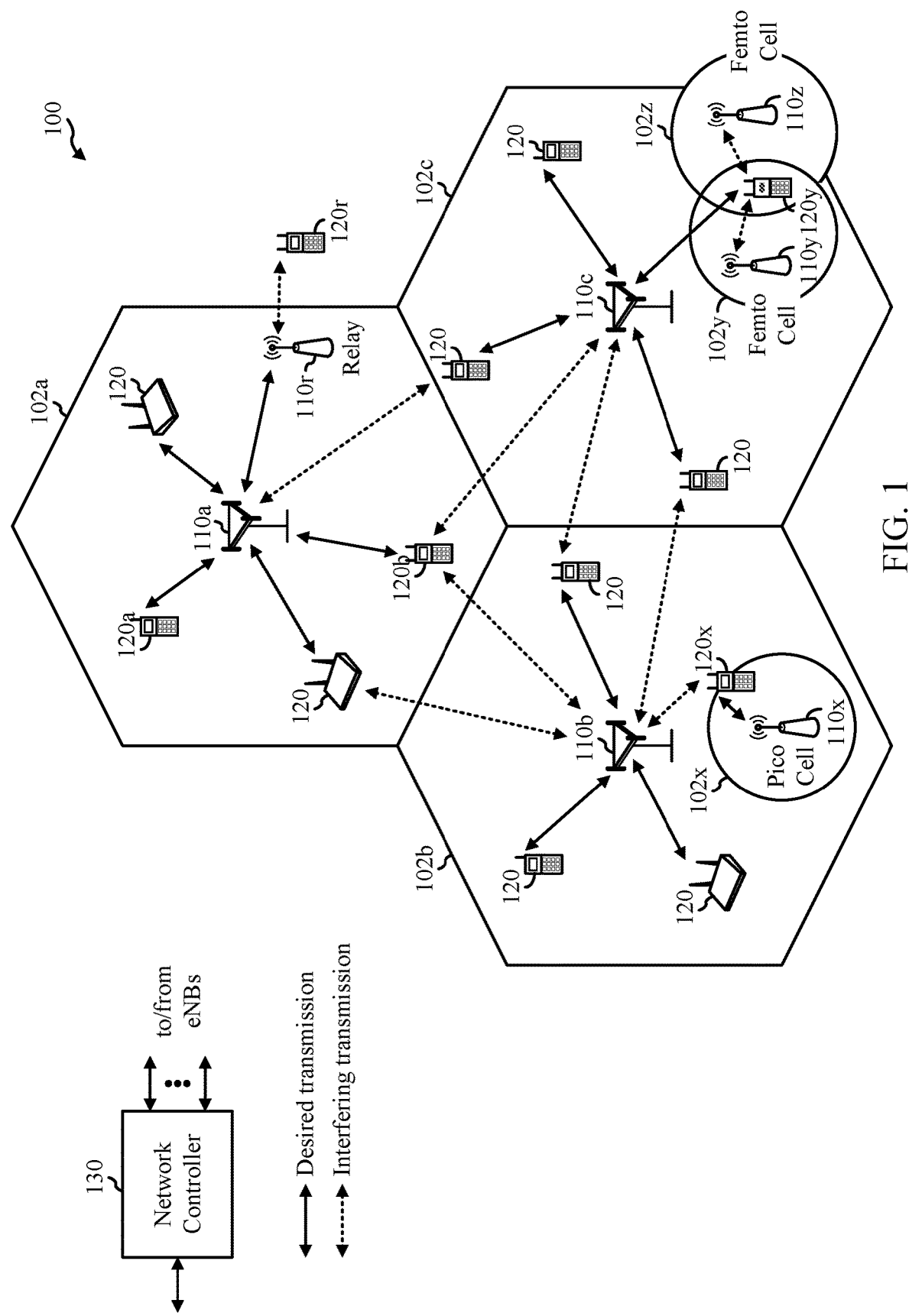
FIG. 1 is a block diagram conceptually illustrating an example telecommunications system, according to aspects of the present disclosure.

Aspects of the present disclosure discuss techniques for spectrum sharing among multiple operators. In certain aspects, each operator may use combinations of reservation periods and data periods to provide access to wireless nodes (e.g., NodeBs and UEs) to a portion of a wireless spectrum assigned (e.g., licensed) to the operator. For example, an operator may divide its spectrum time (e.g., including frames) into reservation periods and data periods, such that each reservation period is followed by one or more data periods. The operator may allow wireless nodes to contend for the operator's spectrum during a reservation period to reserve one or more subsequent data periods on the spectrum for transmission or reception of data. The wireless nodes may include licensed nodes that subscribe to the operator which has licensed the contended spectrum or other unlicensed nodes subscribing to other operators. This way each operator may share its licensed spectrum with other operators that are not licensed to use its spectrum.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

For clarity, while aspects may be described herein using terminology commonly associated with 3G and/or 4G wireless technologies, aspects of the present disclosure can be applied in other generation-based communication systems, such as 5G and later, including NR technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) targeting wide bandwidth (e.g., 80 MHz beyond), millimeter wave (mmW) targeting high carrier frequency (e.g., 60 GHz), massive MTC (mMTC) targeting non-backward compatible MTC techniques, and mission critical targeting ultra reliable low latency communications (URLLC). For these general topics, different techniques are considered, such as coding, low-density parity check (LDPC), and polar codes. NR cell may refer to a cell operating according to the new air interface or fixed transport layer. A NR Node B (e.g., 5G Node B) may correspond to one or multiple transmission reception points (TRPs).

NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some cases DCells may transmit SS. TRPs may transmit downlink signals to UEs indicating the cell type. Based on the cell type indication, the UE may communicate with the TRP. For example, the UE may determine TRPs to consider for cell selection, access, handover, and/or measurement based on the indicated cell type.

In some cases, the UE can receive measurement configuration from the RAN. The measurement configuration information may indicate ACells or DCells for the UE to measure. The UE may monitor/detect measurement reference signals from the cells based on measurement configuration information. In some cases, the UE may blindly detect MRS. In some cases the UE may detect MRS based on MRS-IDs indicated from the RAN. The UE may report the measurement results.

Example Wireless Communications System

FIG. 1 illustrates an example wireless network 100 in which aspects of the present disclosure may be performed. For example, the wireless network may be new radio (NR) or 5G network. Node Bs 110 and UEs 120 in the network may be associated with different operators. In an aspect, a Node B 110 of a first operator monitors, while operating on a first carrier frequency assigned to the first operator, a reservation period on a second carrier frequency assigned to a second operator that shares spectrum with the first operator. The Node B 110 determines, based on the monitoring, whether the second carrier frequency is available for use by the Node B during at least one subsequent data period. The Node B determines whether to contend for access to the second carrier frequency for use during the at least one subsequent data period based on the determined availability.

Figure 5:
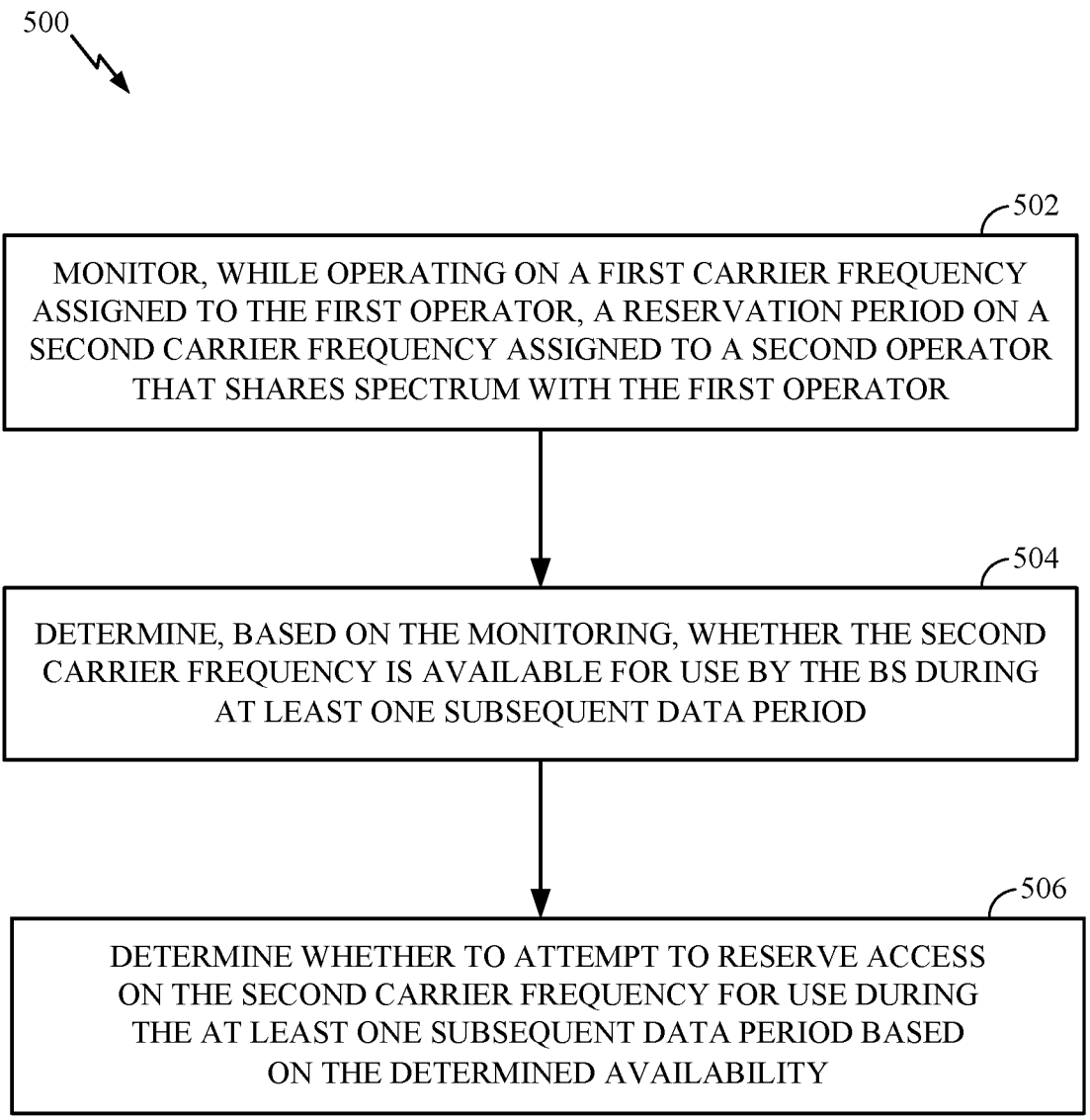
FIG. 5 illustrates example operations that may be performed by a wireless node (e.g., Base Station) of a first operator for accessing a shared spectrum, in accordance with certain aspects of the present disclosure.

Each of the Node Bs 110 or UEs 120 may be configured to perform the operations 500 of FIG. 5. Furthermore, the Node Bs 110 and the UEs 120 may be configured to perform other aspects described for spectrum sharing among operators.

The system illustrated in FIG. 1 may be, for example, a long term evolution (LTE) network. The wireless network 100 may include a number of Node Bs (e.g., eNodeBs, eNBs, 5G Node B, etc) 110 and other network entities. A Node B may be a station that communicates with the UEs and may also be referred to as a base station, an access point, or a 5G Node B.

Each Node B 110 may provide communication coverage for a particular geographic area. In 3GPP, the term "cell" can refer to a coverage area of an Node B and/or an Node B subsystem serving this coverage area, depending on the context in which the term is used.

A Node B may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A Node B for a macro cell may be referred to as a macro Node B. A Node B for a pico cell may be referred to as a pico Node B. A Node B for a femto cell may be referred to as a femto Node B or a home Node B. In the example shown in FIG. 1, the Node Bs 110a, 110b and 110c may be macro Node Bs for the macro cells 102a, 102b and 102c, respectively. The Node B 110x may be a pico Node B for a pico cell 102x. The Node Bs 110y and 110z may be femto Node Bs for the femto cells 102y and 102z, respectively. A Node B may support one or multiple (e.g., three) cells.

The wireless network 100 may also include relay stations. A relay station is a station that receives a transmission of data and/or other information from an upstream station (e.g., a Node B or a UE) and sends a transmission of the data and/or other information to a downstream station (e.g., a UE or a Node B). A relay station may also be a UE that relays transmissions for other UEs. In the example shown in FIG. 1, a relay station 110r may communicate with the Node B 110a and a UE 120r in order to facilitate communication between the Node B 110a and the UE 120r. A relay station may also be referred to as a relay Node B, a relay, etc.

The wireless network 100 may be a heterogeneous network that includes Node Bs of different types, e.g., macro Node Bs, pico Node Bs, femto Node Bs, relays, transmission reception points (TRPs), etc. These different types of Node Bs may have different transmit power levels, different coverage areas, and different impact on interference in the wireless network 100. For example, macro Node Bs may have a high transmit power level (e.g., 20 Watts) whereas pico Node Bs, femto Node Bs and relays may have a lower transmit power level (e.g., 1 Watt).

The wireless network 100 may support synchronous or asynchronous operation. For synchronous operation, the Node Bs may have similar frame timing, and transmissions from different Node Bs may be approximately aligned in time. For asynchronous operation, the Node Bs may have different frame timing, and transmissions from different Node Bs may not be aligned in time. The techniques described herein may be used for both synchronous and asynchronous operation.

A network controller 130 may couple to a set of Node Bs and provide coordination and control for these Node Bs. The network controller 130 may communicate with the Node Bs 110 via a backhaul. The Node Bs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro Node Bs, pico Node Bs, femto Node Bs, relays, etc. In FIG. 1, a solid line with double arrows indicates desired transmissions between a UE and a serving Node B, which is a Node B designated to serve the UE on the downlink and/or uplink. A dashed line with double arrows indicates interfering transmissions between a UE and a Node B.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively. New radio (NR) may use a different air interface, other than OFDM-based. NR networks may include entities such central units or distributed units.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

Figure 2:
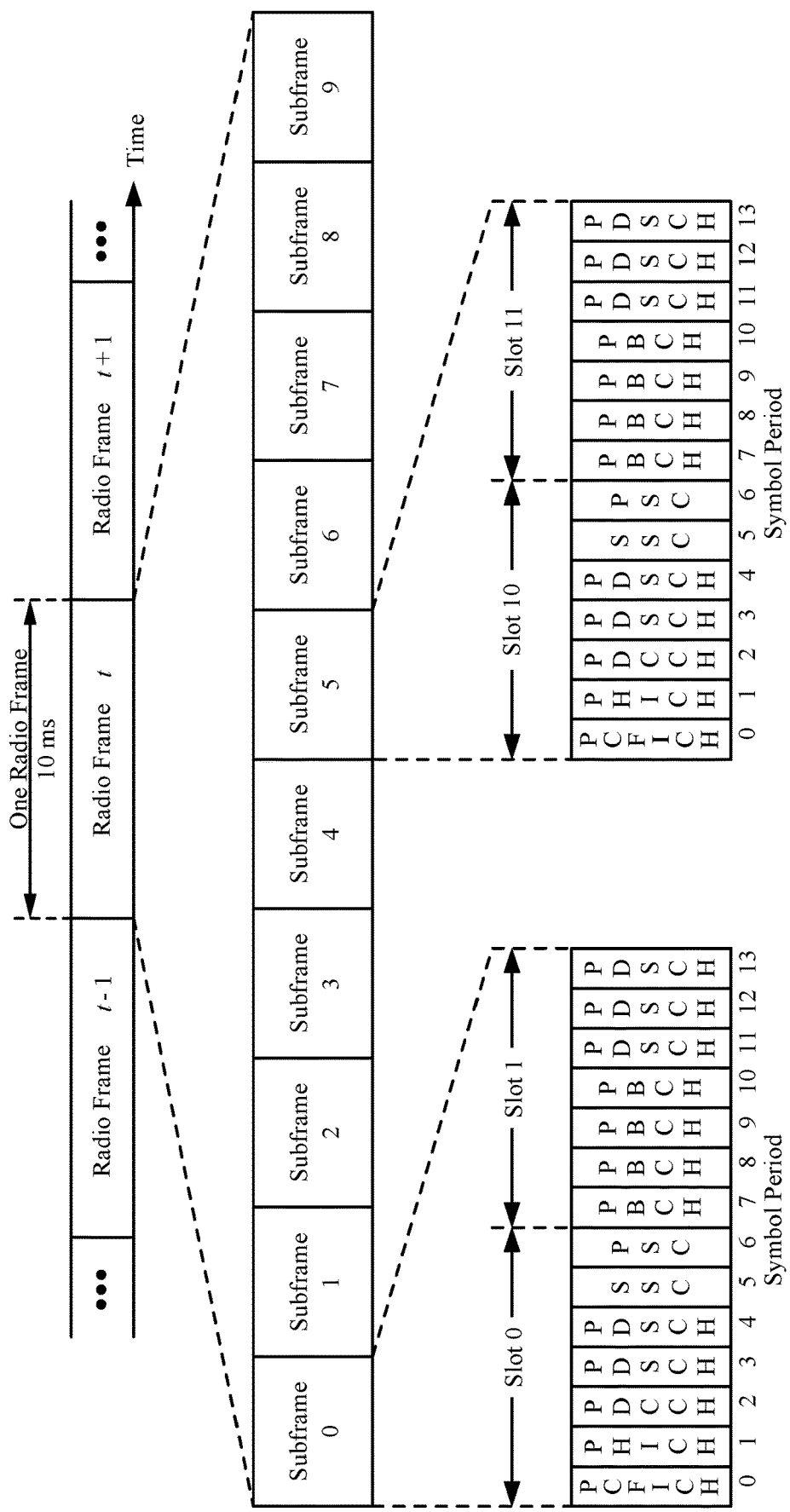
FIG. 2 is a block diagram conceptually illustrating an example downlink frame structure in a telecommunications system, according to aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE, a Node B may send a primary synchronization signal (PSS) and a secondary synchronization signal (SSS) for each cell in the Node B. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The Node B may send a Physical Broadcast Channel (PBCH) in symbol periods 0 to 3 in slot 1 of sub-frame 0. The PBCH may carry certain system information.

The Node B may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The Node B may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The Node B may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The Node B may send the PSS, SSS and PBCH in the center 1.08 MHz of the system bandwidth used by the Node B. The Node B may send the PCFICH and PHICH across the entire system bandwidth in each symbol period in which these channels are sent. The Node B may send the PDCCH to groups of UEs in certain portions of the system bandwidth. The Node B may send the PDSCH to specific UEs in specific portions of the system bandwidth. The Node B may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A Node B may send the PDCCH to the UE in any of the combinations that the UE will search.

A UE may be within the coverage of multiple Node Bs. One of these Node Bs may be selected to serve the UE. The serving Node B may be selected based on various criteria such as received power, path loss, signal-to-noise ratio (SNR), etc.

Figure 3:
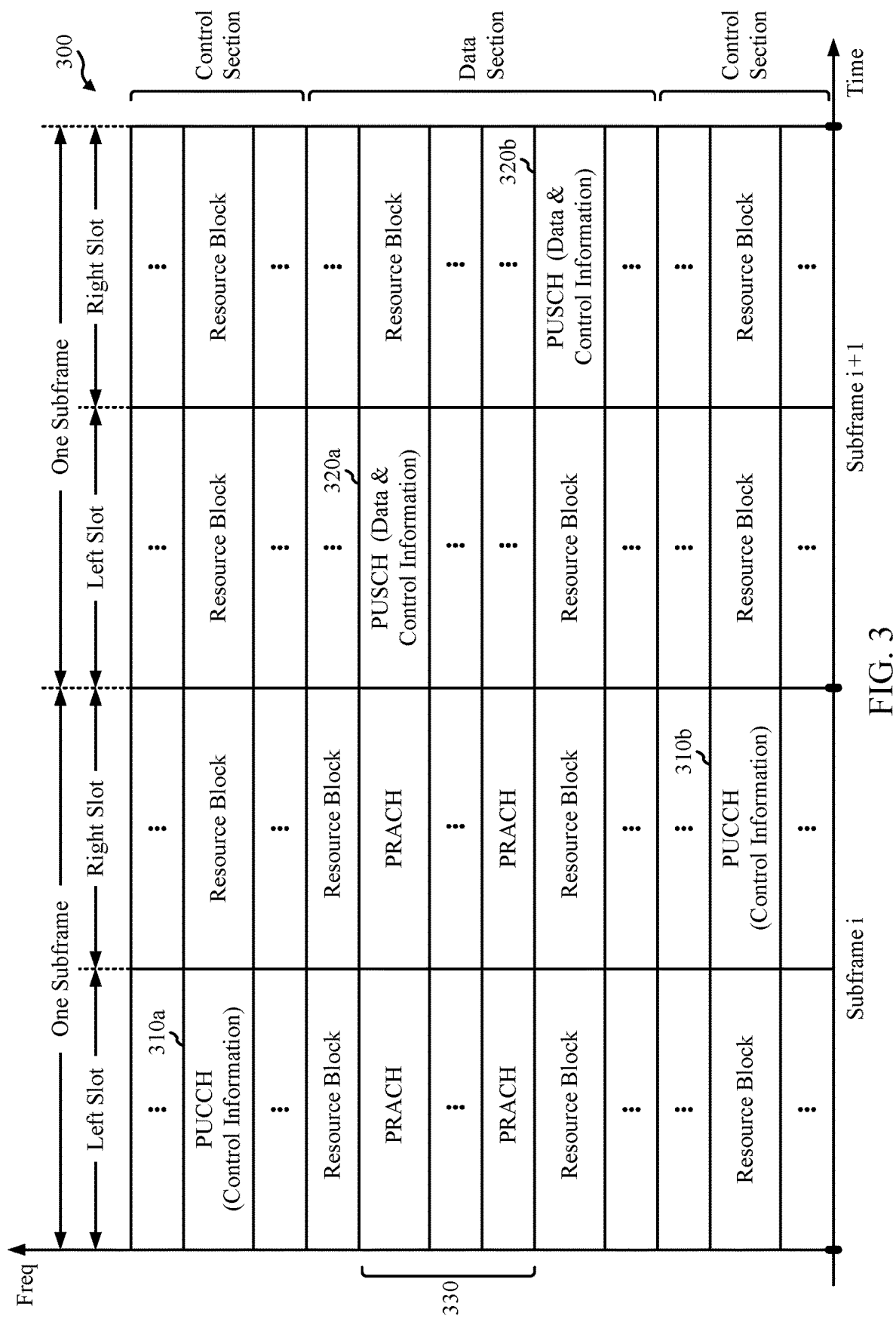
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to a Node B. The UE may also be assigned resource blocks 320a, 320b in the data section to transmit data to the Node B. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
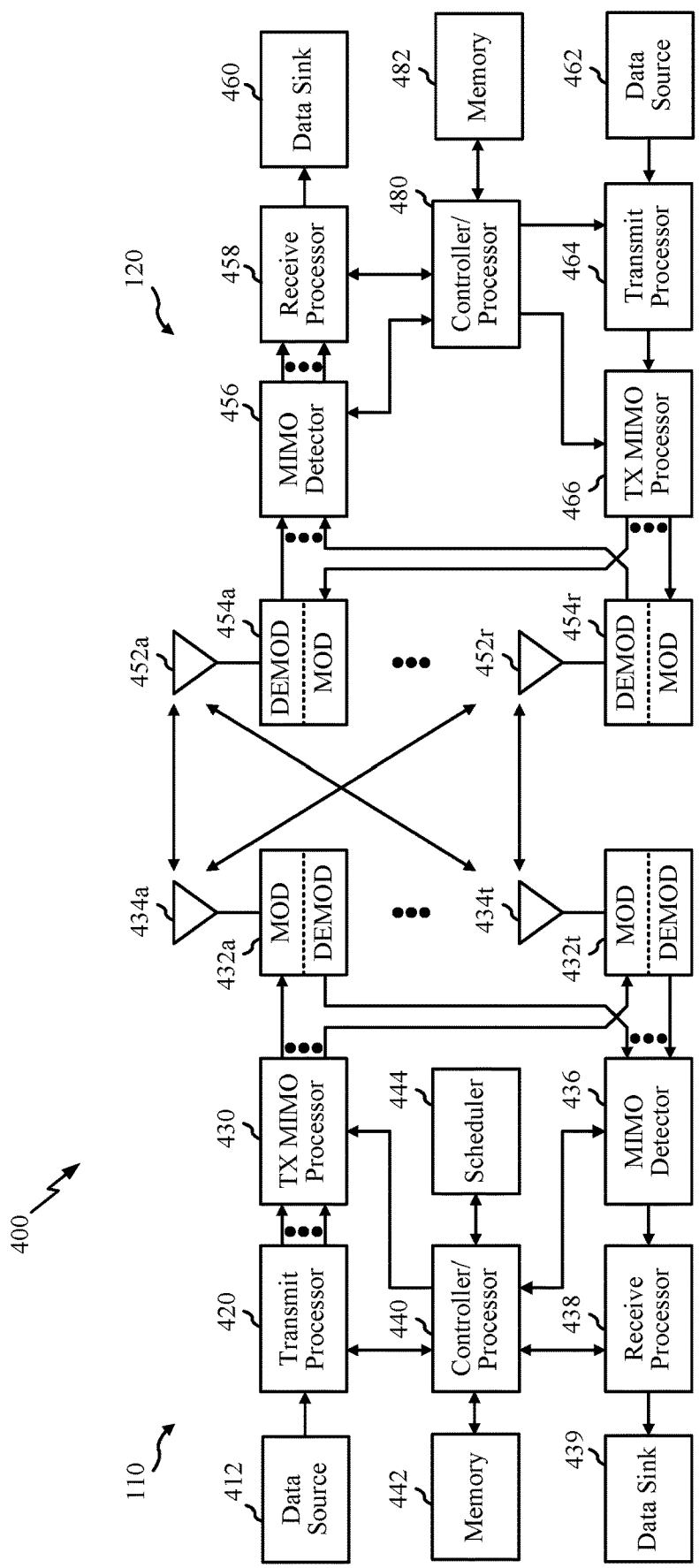
FIG. 4 is a block diagram conceptually illustrating a design of an example Node B and user equipment (UE), according to aspects of the present disclosure.

FIG. 4 illustrates example components of the base station 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 5-7. The BS 110 may comprise a TRP.

FIG. 4 shows a block diagram of a design of a base station/Node B/TRP 110 and a UE 120, which may be one of the base stations/Node Bs/TRPs and one of the UEs in FIG. 1. For a restricted association scenario, the base station 110 may be the macro Node B 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein and those illustrated in the appended drawings. The processor 480 and/or other processors and modules at the UE 120 may also perform or direct, e.g., the execution of various processes for the techniques described herein and those illustrated in the appended drawings. A scheduler 444 may schedule UEs for data transmission on the downlink and/or uplink.

Example New Radio Cell Measurement

New radio (NR) may refer to radios configured to operate according to a wireless standard, such as 5G (e.g. wireless network 100). NR may include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC).

NR cell may refer to a cell operating in the NR network. A NR Node B (e.g., Node B 110) may correspond to one or multiple transmission reception points (TRPs). As used herein, a cell may refer to a combination of downlink (and potentially also uplink) resources. The linking between the carrier frequency of the downlink resources and the carrier frequency of the uplink resources is indicated in the system information (SI) transmitted on the downlink resources. For example, system information can be transmitted in a physical broadcast channel (PBCH) carrying a master information block (MIB).

NR RAN architecture may include a central unit (CU) (e.g., network controller 130). The CU may be an Access node controller (ANC). The CU terminates backhaul interface to RAN-CN, terminates backhaul interface to neighbor RAN node. The RAN may include a distributed unit that may be one or more TRPs that may be connected to one or more ANCs (not shown). TRPs may advertise System Information (e.g., Global TRP ID), may include PDCP/RLC/MAC functions, may comprise one or more antenna ports, may be configured to individually (dynamic selection) or jointly (joint transmission), and may serve traffic to the UE.

Shared Spectrum in NR

Example deployment scenarios for a shared spectrum, which may include use of an unlicensed radio frequency spectrum, may include operator-based deployments, a stand-alone mode of operation, and/or a dual-connectivity mode of operation. In an operator-based deployment, multiple operators may share a same frequency band. A stand-alone mode of operation may include inter-public land mobile network (PLMN) handover from a licensed carrier. A dual-connectivity mode of operation may include connectivity to a shared spectrum component carrier and to an anchor carrier on licensed spectrum.

Access in Unlicensed Spectrum

Medium access in an unlicensed spectrum may involve a dynamic listen before talk (LBT) procedure. Dynamic LBT procedures may allow sharing of network resources (e.g., frequency resources) on millisecond time scale. However, access to the medium may not be guaranteed, for example, in an asynchronous system. For asynchronous operation, the Node Bs (BSs) may have different frame timings, and transmissions from different Node Bs may not be aligned in time (e.g., one or more subframe and/or frame boundaries of different Node Bs may not be contemporaneously aligned).

A Wi-Fi asynchronous system design may be optimized for dynamic LBT procedures. In a Wi-Fi system, beacon transmissions (overhead signals, reference signals) may be subject to LBT. The periodic beacon signals may be "asynchronous" in nature. Beacon transmissions may not be transmitted frequently and receiving stations (STAs) may trigger asynchronous transmission of beacons in a Wi-Fi system.

STA-based mobility may be needed in an effort to compensate for poor radio resource management (RRM) due to, for example, the asynchronous nature of beacon transmissions. Data transmissions may each contain a preamble which may be used for synchronization and detection of the data burst.

Access in Licensed Spectrum

In 4G/LTE, medium access may be optimized for the licensed spectrum. Accordingly, "sensing" (e.g., monitoring or listening) to determine whether another network node is occupying a same RF band before communicating ("talking") on the RF band, in an effort to avoid interference, may not be required. 4G/LTE systems instead use a periodic transmission of overhead signals. RRM procedures exploit the periodic transmission of these overhead signals. Measurement reporting may be utilized for network-controlled mobility that may take into consideration radio conditions and system loading.

Battery life of UEs may be prolonged using a discontinuous reception (DRX) procedure, whereby a UE discontinuously receives information. During a DRX period, a UE may power down most of its circuitry, thereby saving power.

NR may be optimized for licensed spectrum. While 4G/LTE may not support a fast on/off procedure, where a transmitter-BS may communicate with a wireless device, quickly stop using portions of the spectrum, and quickly reestablish communication, NR system designs may support this feature.

Shared Spectrum Medium Access

A shared spectrum may attempt to minimize changes from the operation of the NR licensed spectrum, in an effort to speed-up shared spectrum deployment. The shared spectrum may accommodate periodic transmissions of overhead and/or common channels. The shared spectrum may not make many changes to RRM and may exploit a fast on/off procedure. According to one example, a BS may communicate with a wireless device using a portion of the shared spectrum and may stop use of the shared spectrum, for example, to defer to a licensed transmitter. The BS may restart using the spectrum when the licensed transmitter stops use of spectrum resources.

Operation in a shared spectrum may include a network listen function at a Node B (BS). Deployments may protect overhead and/or common channels of other deployments. Stated otherwise, a node associated with a first spectrum and first operator may protect overhead and/or common channels transmitted by a node associated with a second spectrum and a second operator.

In a shared spectrum, the configuration used by other wireless devices may be learned by detecting and measuring a neighboring Node B's discovery reference signals (DRS) and/or broadcast channel (BCH). A DRS may include, for example, PSS, SSS, CRS, and/or CSI-RS. The shared spectrum may not use an LBT procedure for overhead signals and/or common channels.

A UE, operating in a shared spectrum, may perform an LBT procedure in an effort to access non-protected resources.

A Spectrum Access System (SAS) may allocate channels within and across tiers. These tiers may include, in order of priority, (1) incumbent licensees; (2) Priority Access licensees (PALs); and (3) General Authorized Access (GAA) operators. A shared spectrum may complement SAS server functionality with over-the-air mechanisms for channel selection.

Example Procedures for Accessing Shared Spectrum in NR

Aspects of the present disclosure discuss techniques for spectrum sharing among multiple operators. In certain aspects, each operator may use combinations of reservation periods and data periods to provide access to wireless nodes (e.g., NodeBs and UEs) to a portion of a wireless spectrum assigned (e.g., licensed) to the operator. For example, an operator may divide its spectrum time (e.g., including frames) into reservation periods and data periods, such that each reservation period is followed by one or more data periods. The operator may allow wireless nodes to contend for the operator's spectrum during a reservation period to reserve one or more subsequent data periods on the spectrum for transmission or reception of data. The wireless nodes may include licensed nodes that subscribe to the operator which has licensed the contended spectrum or other unlicensed nodes subscribing to other operators. This way each operator may share its licensed spectrum with other operators that are not licensed to use its spectrum.

In certain aspects, a contention based mechanism may be implemented to resolve contention between multiple nodes contending for a portion of a spectrum at the same time. For example, each node that wants to acquire a medium (e.g., a frequency or set of frequencies) for one or more subsequent data periods may monitor a reservation period prior to the data periods for reservation activity by other nodes. A first node may reserve the medium for the one or more data periods by sending a reservation request on the medium to a second node it wants to communicate with, if it does not detect any reservation activity on the medium by other nodes. The second node, in response to receiving the reservation request, may agree to communicate with the first node by sending a reservation confirmation to the first node, after which the first and second nodes may communicate on the medium over the reserved one or more subsequent data periods. In an aspect, the reservation activity includes reservation requests and reservation confirmations transmitted by other nodes on the medium during the reservation period. In an aspect, if a node contending for the medium detects a reservation request or reservation confirmation transmitted by another node, it refrains from contending for the medium at least until the next reservation period.

In an aspect, the contention based mechanism includes a Reservation Request (RReq)/Reservation Response (RRes) mechanism. For example, the reservation request includes an RReq message and the reservation confirmation includes a RRes message. In an aspect, other schemes utilized for dynamic TDD to ensure avoidance of dominant interference may be used. For example, a simple discovery mechanism may be used where all active nodes transmit discovery signals.

In certain aspects, the contention based mechanism discussed above may be used by nodes to contend for and acquire a spectrum for downlink transmissions and uplink transmissions. For downlink transmissions, a Node B may listen to a medium during a reservation period for reservation activity, and upon detecting no reservation activity, the Node B may transmit an RReq message to a UE to reserve one or more subsequent data periods. The UE, in response to receiving the RReq message, may transmit a RRes message to the Node B accepting to receive downlink transmission from the NodeB. For uplink transmissions, a Node B, upon detecting no reservation activity on the medium, may transmit an RReq message to the UE to request the UE to transmit on the uplink. The UE, in response to receiving the RReq message may transmit a RRes message to the Node B agreeing to transmit on the uplink to the Node B.

In certain aspects, like NodeBs, UEs may independently contend for and attempt to acquire a medium. For example, a UE may monitor a reservation period and upon detecting no reservation activity on the medium may transmit RReq on the medium to another node (e.g., NodeB) to reserve the medium for downlink or uplink transmissions.

In an aspect, a reservation request transmitted by a particular node reserves the medium for an entire data period. Any other node may need to wait until the next reservation period to contend for and attempt to acquire the medium.

FIG. 5 illustrates example operations 500 that may be performed by a wireless node (e.g., Base Station) of a first operator for accessing a shared spectrum, in accordance with certain aspects of the present disclosure. Operations 500 begin, at 502, by monitoring, while operating on a first carrier frequency assigned to the first operator, a reservation period on a second carrier frequency assigned to a second operator that shares spectrum with the first operator. At 504, the wireless node determines, based on the monitoring, whether the second carrier frequency is available for use by the wireless node during at least one subsequent data period. At 506, the wireless node determines whether to attempt to reserve access on the second carrier frequency for use during the at least one subsequent data period based on the determined availability.

In an aspect, each operator has priority over its assigned spectrum (e.g., set of frequencies). Thus, for example, if wireless nodes assigned to different operators are contending in a particular reservation period to communicate over a frequency, the wireless node(s) licensed to the frequency wins and may acquire the frequency.

Thus, in an aspect, referring to operations 500 of FIG. 5, the wireless node determines that the second carrier frequency is not available for use by the wireless node during the subsequent data period if it detects, during the reservation period, at least one of a reservation request (e.g., RReq message) or a reservation confirmation (e.g., RRes message) of a request for reserving the data period by another wireless node operating (e.g., assigned/licensed) on the second carrier frequency. In an aspect, nodes assigned to other operators may contend for a spectrum only if licensed nodes are not using the spectrum.

In an aspect, the wireless node determines that the second carrier frequency is available for use by the wireless node during the subsequent data period if it does not detect any reservation requests (e.g., RReq messages) or confirmation requests (e.g., RRes messages) from other nodes during the reservation period. Once the wireless node determines that the second carrier frequency is available, it may attempt to reserve the frequency for the subsequent data period by transmitting a reservation request (e.g., RReq message) during the reservation period on the second carrier frequency, for example, to another node it wants to communicate with during the data period.

In certain aspects, the first carrier frequency and the second carrier frequency may be assigned in the same frequency band (e.g., adjacent frequencies). In such a case, to avoid interference, the wireless node may need to stop transmitting on the first carrier frequency to monitor the reservation period on the second carrier frequency. In an aspect, for intra-band spectrum sharing, each operator may provide measurement gaps for wireless nodes to monitor other operators' frequencies, wherein nodes do not transmit or receive on their own frequencies during the measurement gaps. In certain aspects, the first carrier frequency and the second carrier frequency may be assigned in different frequency bands. In this case, the wireless node may monitor the reservation period on the second carrier frequency without tuning away from the first carrier frequency. Thus, operators need not provide measurement gaps for inter-band spectrum sharing.

Figure 6:
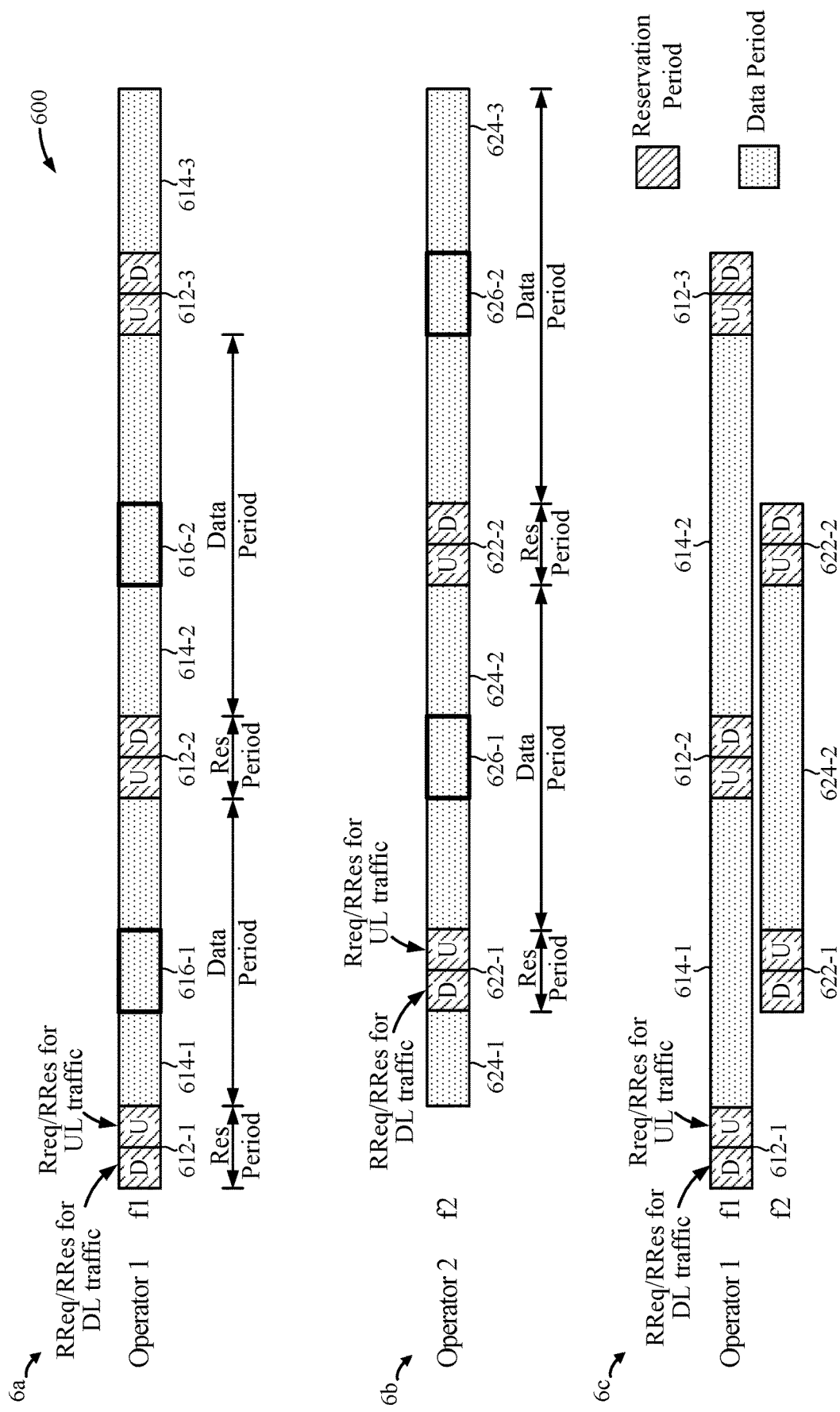
FIG. 6 illustrates inter-band spectrum sharing between two operators in an asynchronous configuration, in accordance with certain aspects of the present disclosure.

FIG. 6 illustrates inter-band spectrum sharing 600 between two operators in an asynchronous configuration, in accordance with certain aspects of the present disclosure. 6a shows a channel structure for Operator 1 on an assigned frequency f1, 6b shows a channel structure for Operator 2 on an assigned frequency f2, and 6c shows an example contention and acquisition by an Operator 1 node on frequencies f1 and f2.

As shown in 6a, Operator 1 has an assigned (e.g., licensed) frequency f1. As shown, time resources on f1 are divided into reservation periods 612-1 to 612-3 and data periods 614-1 to 614-3, with each reservation period 612 followed by a corresponding data period 614. As shown in 6b, Operator 2 has an assigned (e.g., licensed) frequency f2. As shown, time resources on f2 are divided into reservation periods 622-1 to 622-2 and data periods 624-1 to 624-3, with each reservation period 622 followed by a corresponding data period 624. With regard to both Operators 1 and 2, each reservation period allows nodes of both operators to contend for the data period subsequent in time to the reservation period. For example, nodes of Operators 1 and 2 may contend during the reservation period 612-1 for transmitting/receiving in data period 614-1. Further, each of the Operators 1 and 2 have scheduled monitoring periods overlapping in time reservation periods of the other operator to enable it's UEs and/or base stations to contend for other operator's frequency. For example, as shown in 6a, Operator 1 has scheduled monitoring periods 616-1 and 616-2 on f1 overlapping reservation periods 622-1 and 622-2 respectively in time on f2. Similarly, as shown in 6b, Operator 2 has scheduled monitoring periods 626-1 and 626-2 on f2 overlapping reservation periods 612-2 and 612-3 respectively in time on f1. In an aspect, the frequencies f1 and f2 are assigned to different frequency bands and thus each Operator's node may monitor the other operator's reservation period during its monitoring period without tuning out of its own frequency. Further, each operator has priority over its own assigned (e.g., licensed) frequency.

As shown in the example of 6c, a node assigned (licensed) on f1 of Operator 1 successfully reserves the data period 614-1 on f1 during the reservation period 612-1 and starts transmitting in the data period 614-1. During the reservation period 622-1 on f2, the Operator 1 node monitors for reservation activity on f2 and acquires the data period 624-2 when it detects no reservation activity by other nodes. For example, upon detecting no reservation activity on f2 during the reservation period 622-1, the node transmits an RReq message to reserve the data period 624-2. At this point, the node continues to transmit on f1.

During reservation period 612-2 on f1 the Operator 1 node again successfully reserves the subsequent data period 614-2 on f1 and continues transmitting on f1. At this point the node continues to transmit on f2.

During reservation period 622-2 the Operator 1 node detects reservation activity on f2 and ceases to transmit on f2. However, the node continues to transmit on f1 until the next reservation period 612-3 on f1 when it may again contend for f1.

In certain aspects, each operator may configure indicator time slots that enable UEs to report any detected activity on the operator's own spectrum or another operator's spectrum. A Node B may decide whether a frequency is available or not based on a message received from a UE in an indicator time slot. The indicator time slots provide an additional opportunity for a Node B to detect reservation activity on a contended frequency. For example, a Node B may not detect an RReq message from a far away node, while a UE served by the Node B that is relatively near the node may detect the RReq message transmitted by the node. In an aspect, using the indicator time slot is only a way to confirm reservation activity on a frequency and is an optional technique used to complement the RReq/RRes procedure in a reservation period.

Figure 7:
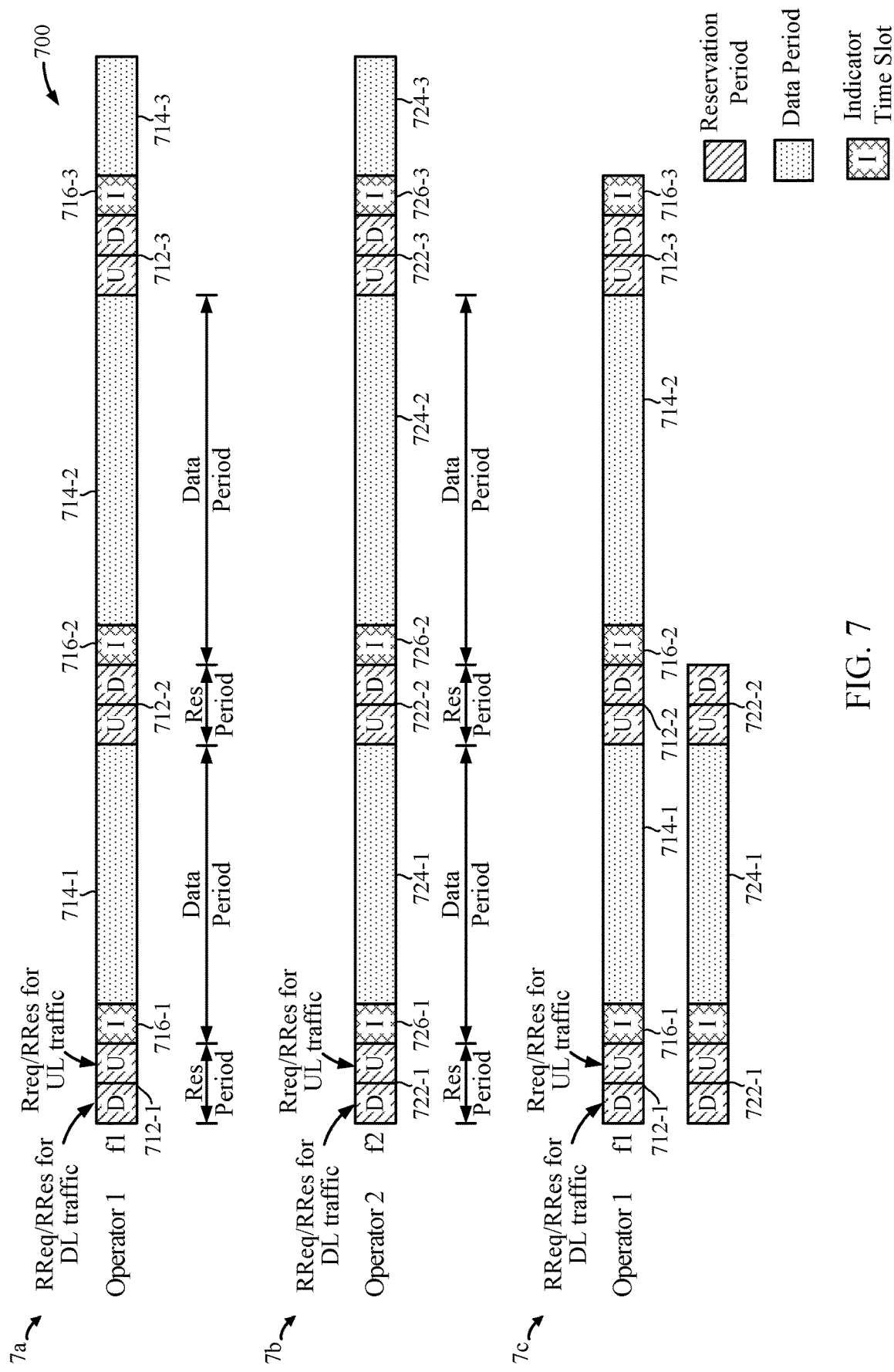
FIG. 7 illustrates inter-band spectrum sharing between two operators in a synchronous configuration, in accordance with certain aspects of the present disclosure.

FIG. 7 illustrates inter-band spectrum sharing 700 between two operators in a synchronous configuration, in accordance with certain aspects of the present disclosure. 7a shows a channel structure for Operator 1 on an assigned frequency f1, 7b shows a channel structure for Operator 2 on an assigned frequency f2, and 6c shows an example contention and acquisition by an Operator 1 node on frequencies f1 and f2.

As shown in 7a, Operator 1 has an assigned (e.g., licensed) frequency f1. As shown, time resources on f1 are divided into reservation periods 712-1 to 712-3 and data periods 714-1 to 714-3, with each reservation period 712 followed by a corresponding data period 714. As shown in 7b, Operator 2 has an assigned (e.g., licensed) frequency f2. As shown, time resources on f2 are divided into reservation periods 722-1 to 722-3 and data periods 724-1 to 724-3, with each reservation period 722 followed by a corresponding data period 724. With regard to both Operators 1 and 2, each reservation period allows nodes of both operators to contend for the data period subsequent in time to the reservation period. For example, nodes assigned (or subscribing) to Operators 1 and 2 may contend during the reservation period 712-1 for transmitting/receiving in data period 714-1. In addition, each of the Operator's frequencies f1 and f2 have indicator time slots 716-1 to 716-3 and 726-1 to 726-3 respectively. The indicator time slots on each operator's frequency may be used by UEs subscribed to that operator for indicating reservation activity detected on the other operator's frequency.

In an aspect, the frequencies f1 and f2 are assigned to different frequency bands and thus each Operator's node may monitor the other operator's reservation period during its monitoring period without tuning out of its own frequency. Further, each operator has priority over its own assigned (e.g., licensed) frequency.

As shown in the example of 7c, a node (e.g., Node B) assigned (licensed) on f1 of Operator 1 attempts to reserve the data period 714-1 on f1 in the reservation period 712-1 and simultaneously monitors reservation period 722-1 on f2 in an attempt to reserve data period 724-1 on f2. In addition, one or more UEs (e.g., UEs assigned to f1) may also monitor reservation activity on f2 during the reservation period 722-1 and provide an indication of any detected reservation activity on f2 to the Operator 1 node. As shown, the Operator 1 node successfully reserves the data period 714-1 on f1, and 724-1 upon detecting no reservation activity on f2.

In reservation period 712-2, the Operator 1 node again attempts reserving f1 for data period 714-2 and also monitors f2 in reservation period 722-2. As shown, this time while the Operator 1 node successfully reserves the data period 714-2 on f1, it fails to reserve the data period 724-2 on f2, for example due to detected reservation activity on f2 and/or the indicator time slot 716-2 indicating reservation activity on f2.

In certain aspects, operators may prioritize contention of downlink or uplink transmission as shown in FIGS. 6 and 7. For example as shown in 6a of FIG. 6, downlink (denoted by 'D') is prioritized over uplink (denoted as 'U') in reservation period 612-1. This means that nodes that want to transmit on the downlink have priority over nodes that want to transmit over uplink. In an aspect, downlink and uplink contention may be scheduled in sequence. For example, since downlink is prioritized over uplink in reservation period 612-1, nodes that want to transmit on downlink contend first and nodes that want to transmit on uplink contend only if no other node reserves the subsequent data period for transmission on the downlink. In an aspect, the downlink and uplink priorities may be swapped according to a configuration or randomly to provide a fair chance to acquire the medium to nodes contending for downlink as well as nodes contending for uplink. In an aspect, the downlink and uplink contentions are not prioritized and nodes contending for downlink as well as uplink contend over an entire reservation period.

In certain aspects, operators may be scheduled to contend in sequence during a reservation period giving one operator higher priority over others. For example, each operator is assigned a particular time slot within a reservation period to contend for the medium. For example, referring to 6a of FIG. 6, Operator 1 may contend for each of the frequencies f1 and f2 first (e.g., in a first time slot within a reservation period) and Operator 2 gets to contend for the frequency (in a later time slot within the reservation period) only if no node assigned to Operator 1 reserves the frequency. In an aspect, the contending sequence and thus the priorities of the Operators to contend for the frequencies may be swapped based on a configuration or randomly to provide a fair chance to each of the operators to reserve the spectrums.

In certain aspects, the frequencies f1 and f2 shown in FIGS. 6 and 7 may be assigned in the same frequency band. In an aspect, the same procedures described for inter-band spectrum sharing may be implemented for intra-band spectrum sharing. In some cases, there is an increased collision probability in intra-band spectrum sharing due to half duplex capability if reservation periods are relying on RReq/RRes like contention. In an aspect, collision may be avoided by careful configuration of the reservation periods. For example, different operators may use different time slots on its corresponding frequencies within the reservation periods in order to enable nodes from all operators to monitor the reservation periods.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product/computer readable medium for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a base station (BS) of a first operator, comprising:
    monitoring, while operating on a first carrier frequency assigned to the first operator, a reservation period on a second carrier frequency assigned to a second operator that shares spectrum with the first operator;
    monitoring an indicator time slot on the first carrier frequency subsequent to the monitoring the reservation period on the second carrier frequency, wherein the monitoring comprises monitoring the indicator time slot for an indication from a user equipment (UE) operating on the first carrier frequency, that the second carrier frequency is not available for use by the BS during at least one subsequent data period, wherein the indication from the UE is based on the UE monitoring the reservation period on the second carrier frequency;
    determining, based on the monitoring the reservation period and the indicator time slot, availability of the second carrier frequency for use by the BS during the at least one subsequent data period; and
    determining whether to attempt to reserve access on the second carrier frequency for use during the at least one subsequent data period based on the determined availability.

2. The method of claim 1, wherein determining the availability of the second carrier frequency for use by the BS comprises:
    detecting, during the reservation period, at least one of a request for reserving the at least one subsequent data period or a confirmation of a request for reserving the at least one subsequent data period, by another wireless node operating on the second carrier frequency; and
    determining, based on the detecting, that the second carrier frequency is not available for use by the BS during the at least one subsequent data period.

3. The method of claim 1, wherein a priority of the second operator to use the second carrier frequency is higher than a priority of the first operator to use the second carrier frequency.

4. The method of claim 1, wherein determining the availability of the second carrier frequency for use by the BS comprises:
    detecting no request or confirmation of a request, during the reservation period, for reserving the at least one subsequent data period; and
    determining, based on the detecting, that the second carrier frequency is available for use by the BS during the at least one subsequent data period.

5. The method of claim 4, further comprising:
    attempting to acquire the second carrier frequency based on the determination that the second carrier frequency is available for use by the BS.

6. The method of claim 5, wherein the attempting to acquire the second carrier frequency comprises sending a request for reserving the second carrier frequency.

7. The method of claim 1, wherein the first carrier frequency and the second carrier frequency are assigned in different frequency bands.

8. The method of claim 1,
    wherein the indication comprises an indication of a detection of at least one of a request for reserving the at least one subsequent data period or a confirmation of a request for reserving the at least one subsequent data period by a wireless node operating on the second carrier frequency; and
    determining, based on the detection, that the second carrier frequency is not available for use by the BS during the subsequent data period.

9. The method of claim 1, wherein the monitoring the reservation period on the second carrier frequency comprises monitoring the reservation period in a time slot within the reservation period assigned to the first operator.

10. The method of claim 9, wherein different operators are assigned different time slots within the reservation period to monitor the reservation of the second carrier frequency.

11. The method of claim 1, wherein the first carrier frequency and the second carrier frequency are assigned in the same frequency band, and wherein the BS tunes out of the first carrier frequency to monitor the reservation period on the second carrier frequency.

12. An apparatus for wireless communication by a base station (BS) of a first operator, comprising:
    means for monitoring, while operating on a first carrier frequency assigned to the first operator, a reservation period on a second carrier frequency assigned to a second operator that shares spectrum with the first operator;
    means for monitoring an indicator time slot on the first carrier frequency subsequent to the monitoring the reservation period on the second carrier frequency, wherein the monitoring comprises monitoring the indicator time slot for an indication from a user equipment (UE) operating on the first carrier frequency, that the second carrier frequency is not available for use by the BS during at least one subsequent data period, wherein the indication from the UE is based on the UE monitoring the reservation period on the second carrier frequency;
    means for determining, based on the monitoring the reservation period and the indicator time slot, availability of the second carrier frequency for use by the BS during at least one subsequent data period; and
    means for determining whether to attempt to reserve access on the second carrier frequency for use during the at least one subsequent data period based on the determined availability.

13. The apparatus of claim 12, wherein the means for determining the availability of the second carrier frequency for use by the BS is configured to:
    detect, during the reservation period, at least one of a request for reserving the at least one subsequent data period or a confirmation of a request for reserving the at least one subsequent data period, by another wireless node operating on the second carrier frequency; and determine, based on the detecting, that the second carrier frequency is not available for use by the BS during the at least one subsequent data period.

14. The apparatus of claim 12, wherein the means for determining the availability of the second carrier frequency for use by the BS is configured to:

detect no request or confirmation of a request, during the reservation period, for reserving the at least one subsequent data period; and determine, based on the detecting, that the second carrier frequency is available for use by the BS during the at least one subsequent data period.

15. The apparatus of claim 12, wherein the indication comprises an indication of a detection of at least one of a request for reserving the at least one subsequent data period or a confirmation of a request for reserving the at least one subsequent data period by a wireless node operating on the second carrier frequency, wherein the means for determining availability of the second carrier frequency is configured to determine, based on the detection, that the second carrier frequency is not available for use by the BS during the subsequent data period.

16. The apparatus of claim 12, wherein the means for monitoring the reservation period on the second carrier frequency is configured to monitor the reservation period in a time slot within the reservation period assigned to the first operator.

17. The apparatus of claim 16, wherein different operators are assigned different time slots within the reservation period to monitor the reservation of the second carrier frequency.

18. The apparatus of claim 12, wherein the first carrier frequency and the second carrier frequency are assigned in the same frequency band, and wherein the BS tunes out of the first carrier frequency to monitor the reservation period on the second carrier frequency.

19. An apparatus for wireless communication by a base station (BS) of a first operator, comprising:

at least one processor configured to:

monitor, while operating on a first carrier frequency assigned to the first operator, a reservation period on a second carrier frequency assigned to a second operator that shares spectrum with the first operator;

monitor an indicator time slot on the first carrier frequency subsequent to the monitoring the reservation period on the second carrier frequency, wherein the monitoring comprises monitoring the indicator time slot for an indication from a user equipment (UE) operating on the first carrier frequency, that the second carrier frequency is not available for use by the BS during at least one subsequent data period, wherein the indication from the UE is based on the UE monitoring the reservation period on the second carrier frequency;

determine, based on the monitoring the reservation period and the indicator time slot, availability of the second carrier frequency for use by the BS during at least one subsequent data period; and determine whether to attempt to reserve access on the second carrier frequency for use during the at least one subsequent data period based on the determined availability.

20. The apparatus of claim 19, wherein the at least one processor is configured to determine the availability of the second carrier frequency for use by the BS by:

detecting, during the reservation period, at least one of a request for reserving the at least one subsequent data period or a confirmation of a request for reserving the at least one subsequent data period, by another wireless node operating on the second carrier frequency; and determining, based on the detecting, that the second carrier frequency is not available for use by the BS during the at least one subsequent data period.

21. The apparatus of claim 19, wherein the at least one processor is configured to determine the availability of the second carrier frequency for use by the BS by:

detecting no request or confirmation of a request, during the reservation period, for reserving the at least one subsequent data period; and determining, based on the detecting, that the second carrier frequency is available for use by the BS during the at least one subsequent data period.

22. The apparatus of claim 19 wherein the indication comprises an indication of a detection of at least one of a request for reserving the at least one subsequent data period or a confirmation of a request for reserving the at least one subsequent data period by a wireless node operating on the second carrier frequency, wherein the at least one processor is configured to determine, based on the detection, that the second carrier frequency is not available for use by the BS during the subsequent data period.

23. The apparatus of claim 19, wherein the at least one processor is configured to monitor the reservation period on the second carrier frequency by monitoring the reservation period in a time slot within the reservation period assigned to the first operator.

24. The apparatus of claim 23, wherein different operators are assigned different time slots within the reservation period to monitor the reservation of the second carrier frequency.

25. A non-transitory computer-readable medium for wireless communication by a base station (BS) of a first operator, storing instructions which when executed by a processor performs a method comprising:

monitoring, while operating on a first carrier frequency assigned to the first operator, a reservation period on a second carrier frequency assigned to a second operator that shares spectrum with the first operator;

monitoring an indicator time slot on the first carrier frequency subsequent to the monitoring the reservation period on the second carrier frequency, wherein the monitoring comprises monitoring the indicator time slot for an indication from a user equipment (UE) operating on the first carrier frequency, that the second carrier frequency is not available for use by the BS during at least one subsequent data period, wherein the indication from the UE is based on the UE monitoring the reservation period on the second carrier frequency;

determining, based on the monitoring the reservation period and the indicator time slot, availability of the second carrier frequency for use by the BS during at least one subsequent data period; and determining whether to attempt to reserve access on the second carrier frequency for use during the at least one subsequent data period based on the determined availability.

26. The computer-readable medium of claim 25, wherein determining the availability of the second carrier frequency for use by the BS comprises:

detecting, during the reservation period, at least one of a request for reserving the at least one subsequent data period or a confirmation of a request for reserving the at least one subsequent data period, by another wireless node operating on the second carrier frequency; and determining, based on the detecting, that the second carrier frequency is not available for use by the BS during the at least one subsequent data period.

27. The computer-readable medium of claim 25, wherein determining the availability of the second carrier frequency for use by the BS comprises:

detecting no request or confirmation of a request, during the reservation period, for reserving the at least one subsequent data period; and determining, based on the detecting, that the second carrier frequency is available for use by the BS during the at least one subsequent data period.

28. The computer-readable medium of claim 25, further comprising instructions for:

wherein the indication comprises an indication of a detection of at least one of a request for reserving the at least one subsequent data period or a confirmation of a request for reserving the at least one subsequent data period by a wireless node operating on the second carrier frequency, wherein determining availability of the second carrier frequency comprises determining, based on the detection, that the second carrier frequency is not available for use by the BS during the subsequent data period.

29. The computer-readable medium of claim 25, wherein the monitoring the reservation period on the second carrier frequency comprises monitoring the reservation period in a time slot within the reservation period assigned to the first operator.

30. The computer-readable medium of claim 29, wherein different operators are assigned different time slots within the reservation period to monitor the reservation of the second carrier frequency.

* * * * *